United States Patent
Lo et al.

(10) Patent No.: US 12,461,121 B2
(45) Date of Patent: Nov. 4, 2025

(54) SHOCK INDICATOR

(71) Applicant: Industrial Technology Research Institute, Hsinchu (TW)

(72) Inventors: Yu-Jan Lo, Taoyuan (TW); Shih-Jia Shen, Taichung (TW); Sheng-Jui Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 290 days.

(21) Appl. No.: 18/452,550

(22) Filed: Aug. 20, 2023

(65) Prior Publication Data

US 2024/0168050 A1    May 23, 2024

Related U.S. Application Data

(60) Provisional application No. 63/426,040, filed on Nov. 17, 2022.

(30) Foreign Application Priority Data

Jun. 20, 2023   (TW) .................... 112123022

(51) Int. Cl.
*G01P 15/03*    (2006.01)
*G01P 1/02*     (2006.01)

(52) U.S. Cl.
CPC ............ *G01P 15/032* (2013.01); *G01P 1/023* (2013.01)

(58) Field of Classification Search
CPC ........ G01P 15/032; G01P 1/023; G01P 15/04; G01P 15/036
See application file for complete search history.

(56) References Cited

U.S. PATENT DOCUMENTS

| | | | |
|---|---|---|---|
| 9,103,734 B2 | 8/2015 | Branch | |
| 10,222,292 B2 | 3/2019 | Evjen | |
| 11,249,107 B2* | 2/2022 | Fonk | G01P 15/04 |
| 2013/0062916 A1 | 3/2013 | Wiley | |
| 2019/0011888 A1* | 1/2019 | Lenoir | G01P 15/0891 |

FOREIGN PATENT DOCUMENTS

| | | |
|---|---|---|
| CN | 1668927 | 9/2005 |
| CN | 204694385 | 10/2015 |
| WO | 2008060003 | 5/2008 |

OTHER PUBLICATIONS

"Notice of allowance of Taiwan Counterpart Application", issued on Mar. 13, 2024, p. 1-p. 3.

* cited by examiner

*Primary Examiner* — Xin Y Zhong
(74) *Attorney, Agent, or Firm* — JCIPRNET

(57) ABSTRACT

A shock indicator, including a first cover, a base, a counterweight, and a shrapnel, is provided. The first cover has an accommodating space. The base is disposed in the accommodating space of the first cover. The counterweight is located in the accommodating space. The counterweight has a pivot end pivotally disposed on the base, and the counterweight rotates relative to the base with the pivot end as a rotation axis. The shrapnel is disposed on the base and is located in the accommodating space. The counterweight and the shrapnel are located on two opposite sides of the base. The shrapnel has two ends, and the two ends of the shrapnel clamp the counterweight along a contour of the counterweight.

14 Claims, 5 Drawing Sheets

SHOCK INDICATOR

CROSS-REFERENCE TO RELATED APPLICATION

This application claims the priority benefit of U.S. provisional application Ser. No. 63/426,040, filed on Nov. 17, 2022 and Taiwan application serial no. 112123022, filed on Jun. 20, 2023. The entirety of each of the above-mentioned patent applications is hereby incorporated by reference herein and made a part of this specification.

TECHNICAL FIELD

The disclosure relates to a shock indicator.

BACKGROUND

With the development of the economy, the scope of circulation of cargos is becoming wider and wider. Whether the states of fragile items and precision instruments are intact needs to be paid attention to at all times during transportation.

However, during the process of transportation, due to various factors such as road conditions and vehicle speeds, collisions between cargos inevitably occur. Since the fragile items and precision instruments are packaged with cushioning materials before transportation, the external packaging cannot always be unpacked during transportation to confirm the states of the items and instruments. The external packaging can only be unpacked to check the integrity of the fragile items and precision instruments until the items and instruments have been delivered.

When the end consumer signs for a cargo and checks that an item is broken or an instrument is damaged, it is usually difficult to clarify the responsibility.

A shock indicator may be used as a reference for the user to judge that a cargo is subjected to a specific magnitude of acceleration, and inform the transportation personnel to handle with care, thereby reducing the chance of damage to the items and instruments, and the shock indicator may be used as a basis for clarifying the responsibility for the damage of the cargo.

FIG. 1 is a schematic view of a conventional shock indicator. Please refer to FIG. 1. A conventional shock indicator 100 includes a counterweight 110 in conjunction with two shrapnels 120. Usually, the trigger acceleration of the shock indicator includes settings such as 5 G, 10 G, 15 G, 25 G, 37 G, and 50 G, and the weight of the counterweight 110, the thickness of the shrapnel 120, and the spacing between slots 130 need to be adjusted at the same time for different trigger acceleration values to achieve a preset G value.

SUMMARY

A shock indicator capable of easily identifying whether a cargo is subjected to an external force is introduced herein.

A shock indicator of the disclosure includes a first cover, a base, a counterweight, and a shrapnel. The first cover has an accommodating space. The base is disposed in the accommodating space of the first cover. The counterweight is located in the accommodating space. The counterweight has a pivot end pivotally disposed on the base, and the counterweight rotates relative to the base with the pivot end as a rotation axis. The shrapnel is disposed on the base and is located in the accommodating space. The counterweight and the shrapnel are located on two opposite sides of the base, and the shrapnel has two ends. The two ends of the shrapnel clamp the counterweight along a contour of the counterweight.

Based on the above, the shock indicator may be installed on the external packaging of the cargo and transported together with the cargo, so whether the cargo is subjected to an external force can be conveniently and intuitively checked.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSURED EMBODIMENTS

Figure 1:
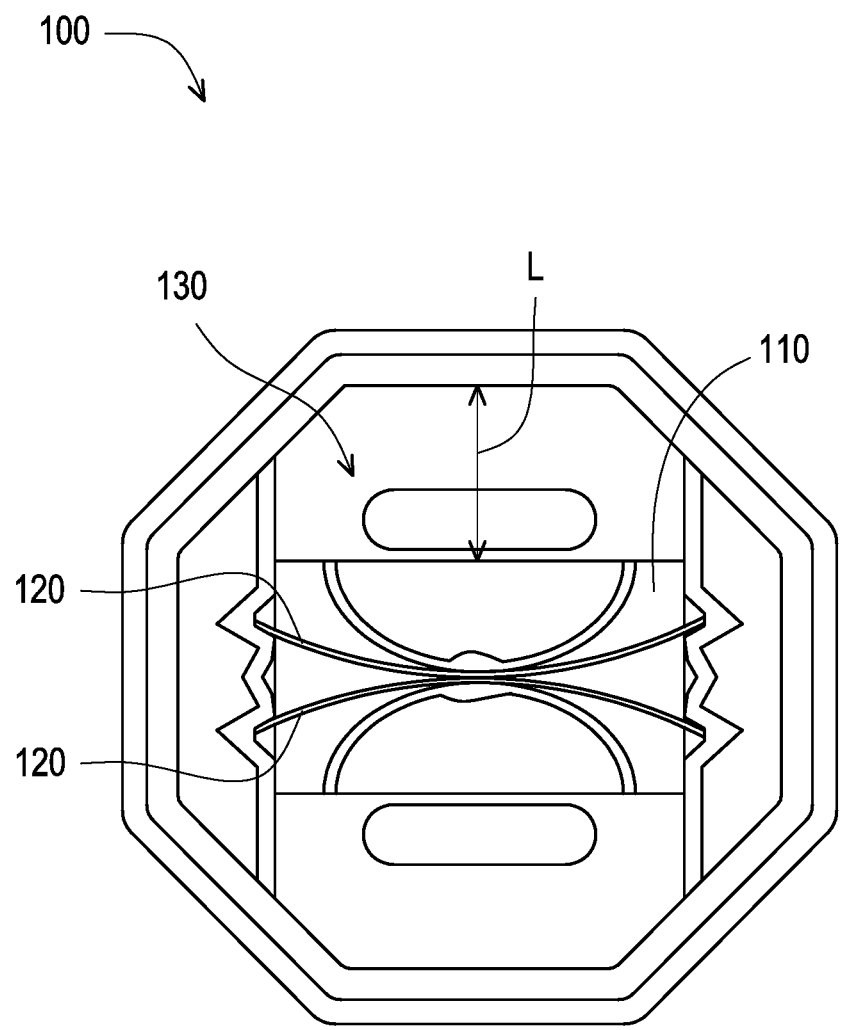
FIG. 1 is a schematic view of a conventional shock indicator.
Figure 2:
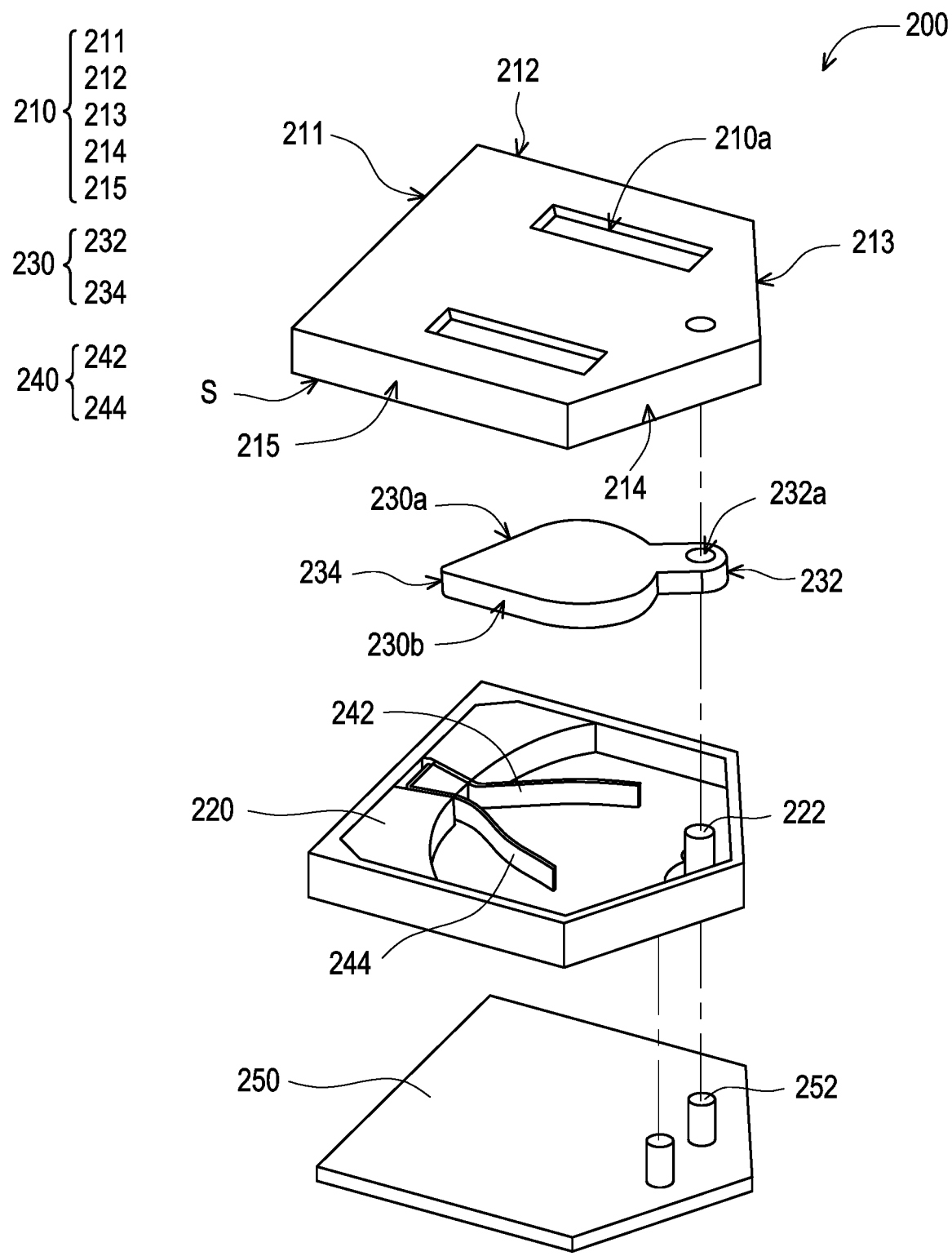
FIG. 2 is an exploded schematic view of a shock indicator.
Figure 3:
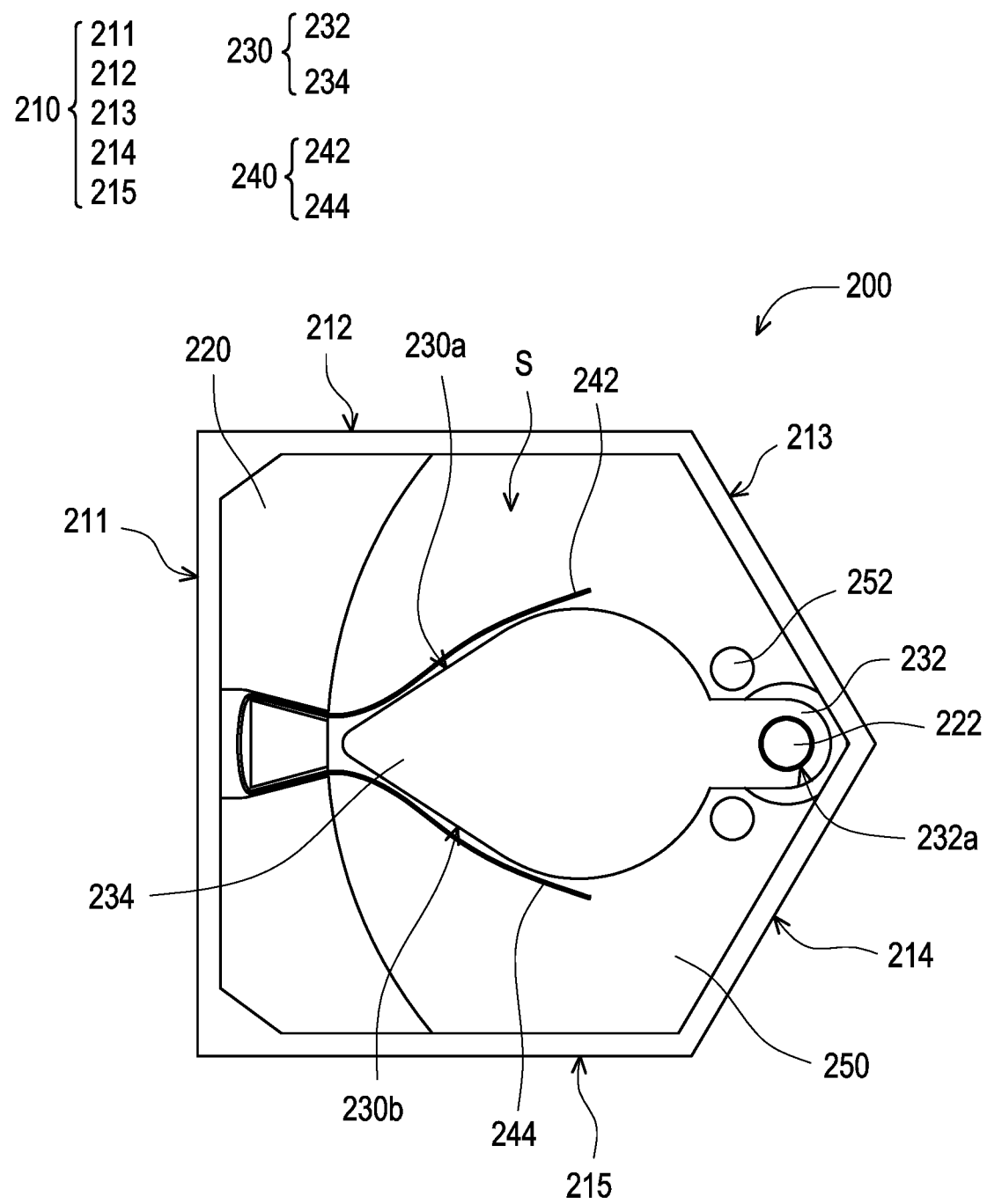
FIG. 3 is an assembly schematic view of the shock indicator of FIG. 2.

FIG. 2 is an exploded schematic view of a shock indicator, and FIG. 3 is an assembly schematic view of the shock indicator of FIG. 2. In order to clearly show the configuration relationship between various components, a cover plate of a first cover is transparent here.

Please refer to FIG. 2 and FIG. 3 at the same time. A shock indicator 200 of this embodiment includes a first cover 210, a base 220, a counterweight 230, and a shrapnel 240. The first cover 210 has an accommodating space S. The base 220 is disposed in the accommodating space S of the first cover 210. The counterweight 230 is located in the accommodating space S, wherein the counterweight 230 has a pivot end 232 pivotally disposed on the base 220, and the counterweight 230 may rotate relative to the base 220 with the pivot end 232 as the rotation axis. The shrapnel 240 is disposed on the base 220 and is located in the accommodating space S. The counterweight 230 and the shrapnel 240 are located on two opposite sides of the base 220, and the shrapnel 240 has two ends 242 and 244, wherein the two ends 242 and 244 of the shrapnel 240 clamp the counterweight 230 along the contour of the counterweight 230.

In this embodiment, the shapes of the first cover 210 and the base 220 correspond to each other, and the shapes of the first cover 210 and the base 220 are pentagonal, but not limited thereto. In other embodiments, the shapes of the first cover 210 and the base 220 may also be hexagonal or other shapes and may be modified according to actual requirements.

The first cover 210 has a first side wall 211, a second side wall 212, a third side wall 213, a fourth side wall 214, and a fifth side wall 215 which are connected in sequence and form a closed loop, wherein the second side wall 212 and the fifth side wall 215 are respectively connected to two ends of the first side wall 211, two ends of the third side wall 213 are respectively connected to the second side wall 212 and the fourth side wall 214, and a junction of the third side wall 213 and the fourth side wall 214 forms a tip relative to the first side wall 211. The shapes of the first cover 210 and the base 220 are not limited to the description here.

The shrapnel 240 is disposed adjacent to the first side wall 211, and the pivot end 232 of the counterweight 230 is adjacent to the junction of the third side wall 213 and the fourth side wall 214.

In this embodiment, the distance from the first side wall 211 to a connecting end point of the third side wall 213 and the fourth side wall 214 is 44 mm, and the length of the first side wall 211 is 41 mm. In addition, the total length of the shrapnel 240 is 52 mm, and the shrapnel 240 is symmetrically disposed with the pivot end 232 of the counterweight 230 as the center of symmetry.

The end 242 of the shrapnel 240 extends toward the second side wall 212 and the end 244 extends toward the fifth side wall 215, and the two ends 242 and 244 clamp the counterweight 230 along the contour of the counterweight 230. In this embodiment, the shape of the counterweight 230 is similar to a water drop, but the shape of the counterweight 230 is not limited to the description here. In other possible implementations, the shape of the counterweight 230 may also be similar to a leaf blade or a spade in a poker card, wherein the tip of the leaf blade or the spade is disposed toward the shrapnel 240.

In an embodiment of the disclosure, the base 220 has a first assembly structure 222, the pivot end 232 has a second assembly structure 232a, and the first assembly structure 222 and the second assembly structure 232a interfere with each other to assemble the counterweight 230 on the base 220. Specifically, the first assembly structure 222 in this embodiment is a convex rib, and the second assembly structure 232a is an opening, and the convex rib is correspondingly inserted into the opening to install the counterweight 230 on the base 220.

Via such an arrangement, the counterweight 230 may take the convex rib as the rotation axis, and an end 234 of the counterweight 230 opposite to the pivot end 232 may rotate and swing relative to the convex rib.

The shock indicator 200 also includes a second cover 250, and the base 220 is located between the first cover 210 and the second cover 250, wherein the second cover 250 has a pair of limiting members 252 protruding toward the base 220 and located on two sides of the counterweight 230. The second cover 250 limits the swing range and the position of the counterweight 230 by the limiting members 252.

The shape of the second cover 250 corresponds to the shapes of the first cover 210 and the base 220. In other possible implementations, the shape of the second cover 250 may not correspond to the first cover 210 and the base 220 without affecting the overall operation of the shock indicator 200. In addition, the shapes of the first cover 210, the second cover 250, and the base 220 are not limited to the shapes described in this embodiment and may be changed according to actual requirements.

In addition, the first cover 210 also has a pair of opening windows 210a disposed on the two sides of the counterweight 230 with the pivot end 232 of the counterweight 230 as the center of symmetry. The setting of the opening windows 210a allows the user to visually observe the position of the counterweight 230 from the outside to judge the direction of an impact force.

Figure 4A:
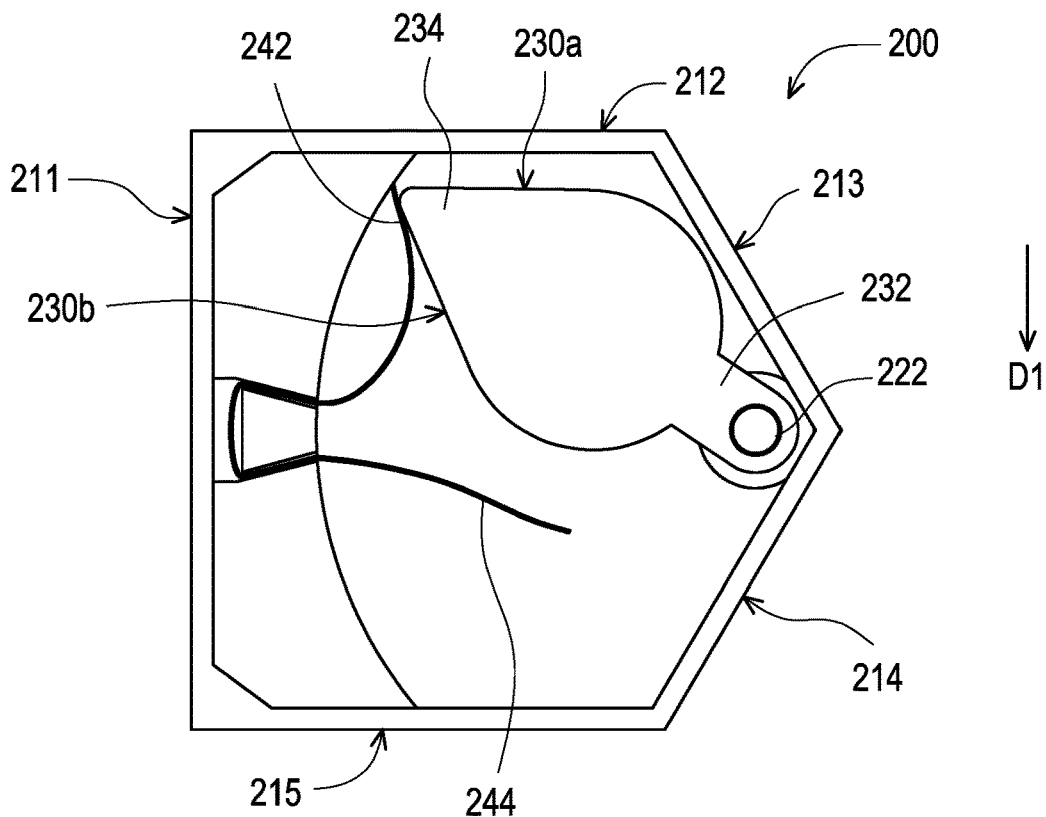
FIG. 4A is a schematic view of the shock indicator of FIG. 2 being triggered by an impact force along a first direction.

FIG. 4A is a schematic view of the shock indicator of FIG. 2 being triggered by an impact force along a first direction. Please refer to FIG. 2, FIG. 3, and FIG. 4A at the same time.

In a normal state, that is, before the shock indicator 200 is used, the position of the counterweight 230 is limited by the pair of limiting members 252 of the second cover 250, that is, the counterweight 230 can only swing slightly.

When the shock indicator 200 is intended to be used, the shock indicator 200 may be placed on a cargo, and the second cover 250 of the shock indicator 200 is disassembled from the base 220 to release the limitation on the counterweight 230 by the limiting members 252 of the second cover 250. Incidentally, after the second cover 250 is disassembled from the base 220, an elastic force provided by the shrapnel 240 supports the counterweight 230, so that the counterweight 230 remains in the accommodating space S.

In an embodiment, the limiting member 252 may also be a "⊓"-shaped independent component snapped into the second cover 250. In this way, when the shock indicator 200 is intended to be used, the limiting member 252 is removed from the second cover 250 to release the limitation on the counterweight 230.

During the transportation of the cargo, when the shock indicator 200 is subjected to an impact force along a first direction D1, the counterweight 230 swings in a direction opposite to the force direction of the impact force, that is, opposite to the first direction D1 due to the influence of inertia. Specifically, the end 234 of the counterweight 230 opposite to the pivot end 232 swings toward the second side wall 212.

While the end 234 of the counterweight 230 opposite to the pivot end 232 swings toward the second side wall 212, the end 242 of the shrapnel 240 contacting the first side edge 230a of the counterweight 230 is deformed along with the swing of the counterweight 230, and at the same time, the end 242 of the shrapnel 240 that originally clamps the first side edge 230a of the counterweight 230 moves from the first side edge 230a of the counterweight 230 to the second side edge 230b along the contour of the counterweight 230, and an elastic restoring force of the shrapnel 240 is applied to the second side edge 230b of the counterweight 230 via the end 242, so as to prevent the counterweight 230 from rebounding in reverse.

At this time, via the opening window 210a of the first cover 210, the position of the counterweight 230 may be clearly and intuitively recognized, thereby judging the direction of the impact force on the cargo.

Figure 4B:
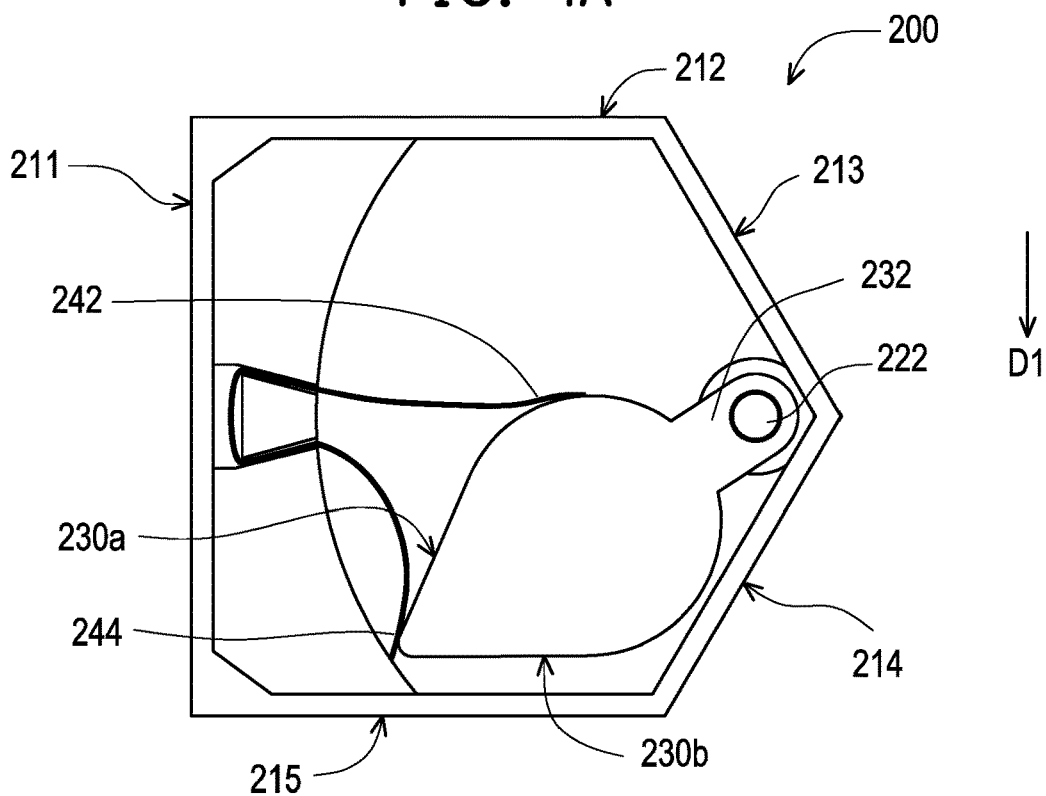
FIG. 4B is a schematic view of the shock indicator of FIG. 2 being triggered by a reverse impact force along the first direction.

FIG. 4B is a schematic view of the shock indicator of FIG. 2 being triggered by a reverse impact force along the first direction. Please refer to FIG. 2, FIG. 3, and FIG. 4B at the same time.

When the shock indicator 200 is subjected to an impact force opposite to the first direction D1, the counterweight 230 swings toward the fifth side wall 215 in a direction opposite to the force direction of the impact force, that is, the same as the first direction D1 due to the influence of inertia.

The end 244 of the shrapnel 240 that originally clamps the second side edge 230b of the counterweight 230 moves from the second side edge 230b of the counterweight 230 to the first side edge 230a along the contour of the counterweight 230, and the elastic restoring force of the shrapnel 240 is applied to the first side edge 230a of the counterweight 230 by the end 244, so as to prevent the counterweight 230 from rebounding in reverse.

Compared with the conventional shock indicator 100, the shock indicator 200 of this embodiment does not need to be provided with a slot because the shape of the counterweight 230 is changed and the shrapnel 240 clamps the outer contour of the counterweight 230. Therefore, a target G value can be achieved only by adjusting the weight of the counterweight 230 and the thickness of the shrapnel 240.

In addition, compared with the conventional shock indicator 100, the shock indicator 200 of this embodiment has more accurate measurement.

Figure 5A:
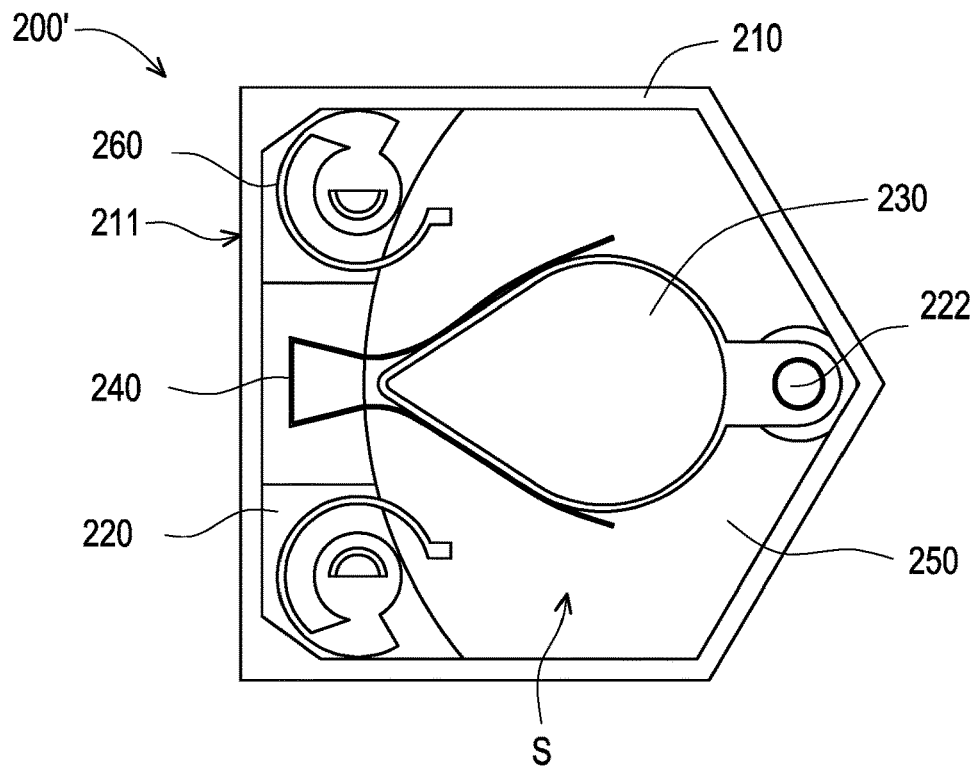
FIG. 5A is a schematic view of a shock indicator further provided with an anti-rebound member.

FIG. 5A is a schematic view of a shock indicator further provided with an anti-rebound member. Please refer to FIG. 5A. A shock indicator 200' may also include a pair of anti-rebound members 260 disposed on the base 220 and disposed adjacent to the first side wall 211 on two sides of the shrapnel 240, and the anti-rebound members 260 shown in FIG. 5A are vortex springs. The setting of the anti-rebound members 260 can further prevent the counterweight 230 from rebounding in reverse.

Specifically, when the counterweight 230 rotates toward the direction of the original untriggered position along the rotation axis and moves to contact with the anti-rebound member 260, the anti-rebound member 260 supports and blocks the counterweight 230 to prevent the counterweight 230 from continuing to rotate toward the untriggered position, so as to keep the counterweight 230 in the triggered region.

Figure 5B:
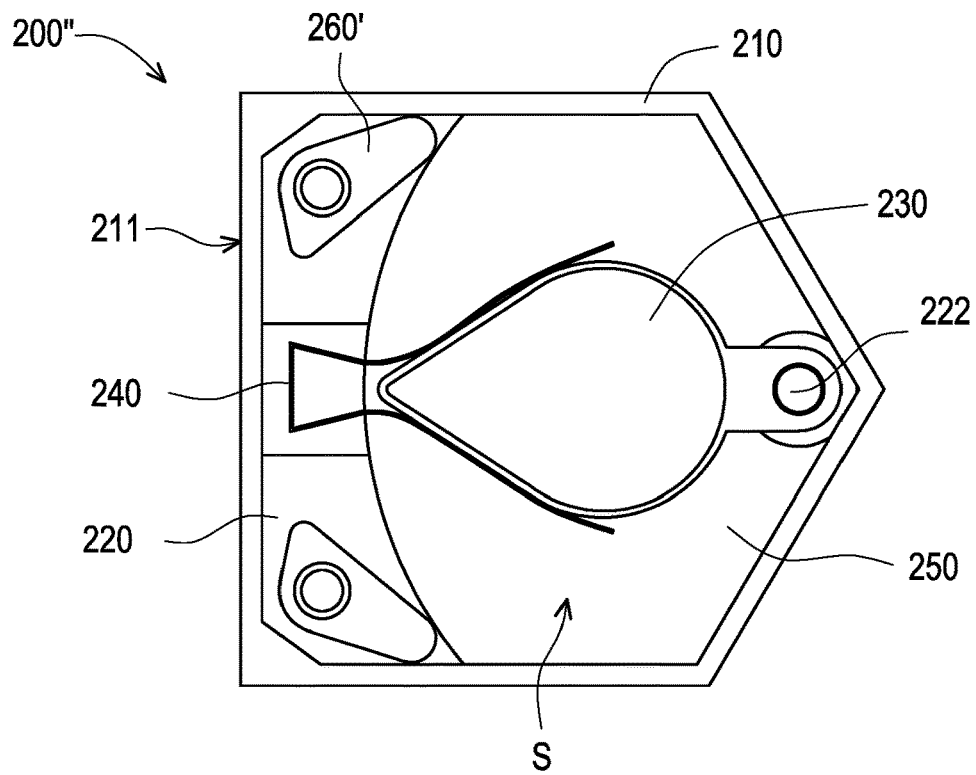
FIG. 5B is a schematic view of selecting a ratchet as an anti-rebound member.

Although the anti-rebound member 260 is described by taking the vortex spring as an example, the anti-rebound member 260 is not limited thereto. FIG. 5B is a schematic view of selecting a ratchet as an anti-rebound member. In a shock indicator 200" as shown in FIG. 5B, an anti-rebound member 260' may also be a ratchet.

The vortex spring and the ratchet may both provide an auxiliary force to the counterweight 230 to further prevent the counterweight 230 from rebounding in reverse.

In summary, the shock indicator of the disclosure is installed on the external packaging of an item to be transported together with the cargo, wherein whether the item is subjected to an external force can be conveniently and intuitively checked through the opening window on the first cover.

In addition, the overall structure can be simplified via changing the shape of the counterweight and changing the shrapnel to clamp the contour of the counterweight. Compared with the conventional structure, the setting of the slot may be omitted, which can reduce errors caused by tolerances.

Furthermore, since there is no need to provide the slot, the preset G value can be achieved only by adjusting the weight of the counterweight and the thickness of the shrapnel, which is simpler and faster than the conventional manner of adjusting the G value.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A shock indicator, comprising:
   a first cover, having an accommodating space;
   a base, disposed in the accommodating space of the first cover;
   a counterweight, located in the accommodating space, wherein the counterweight has a pivot end pivotally disposed on the base, and the counterweight rotates relative to the base with the pivot end as a rotation axis;
   a shrapnel, disposed on the base and located in the accommodating space, wherein the counterweight and the shrapnel are located on two opposite sides of the base, the shrapnel has two ends, and the two ends of the shrapnel clamp the counterweight along a contour of the counterweight.

2. The shock indicator according to claim 1, wherein the first cover and the base are pentagonal.

3. The shock indicator according to claim 2, wherein the first cover has a first side wall, a second side wall, a third side wall, a fourth side wall, and a fifth side wall which are connected in sequence and form a closed loop.

4. The shock indicator according to claim 3, wherein the shrapnel is disposed adjacent to the first side wall, and the pivot end of the counterweight is adjacent to a junction of the third side wall and the fourth side wall.

5. The shock indicator according to claim 4, wherein one of the two ends of the shrapnel extends toward the second side wall, and other one of the two ends extends toward the fifth side wall.

6. The shock indicator according to claim 1, wherein the base has a first assembly structure, the pivot end has a second assembly structure, and the first assembly structure and the second assembly structure interfere with each other to assemble the counterweight on the base.

7. The shock indicator according to claim 6, wherein one of the first assembly structure and the second assembly structure is a convex rib, and other one of the first assembly structure and the second assembly structure is an opening.

8. The shock indicator according to claim 3, further comprising a pair of anti-rebound members disposed on the base and disposed adjacent to the first side wall on two sides of the shrapnel.

9. The shock indicator according to claim 8, wherein the pair of anti-rebound members are vortex springs or ratchets.

10. The shock indicator according to claim 1, further comprising a second cover, wherein the base is located between the first cover and the second cover.

11. The shock indicator according to claim 10, wherein the second cover has a pair of limiting members, and the pair of limiting members protrude toward the base and are located on two sides of the counterweight.

12. The shock indicator according to claim 1, wherein the first cover also has a pair of opening windows disposed on two sides of the counterweight with the pivot end of the counterweight as a center of symmetry.

13. The shock indicator according to claim 1, wherein the counterweight is shaped as a water drop or a leaf blade.

14. The shock indicator according to claim 1, wherein when the shock indicator is subjected to an impact force, a swing direction of the counterweight is opposite to a direction of the impact force.

* * * * *